Patented July 31, 1923.

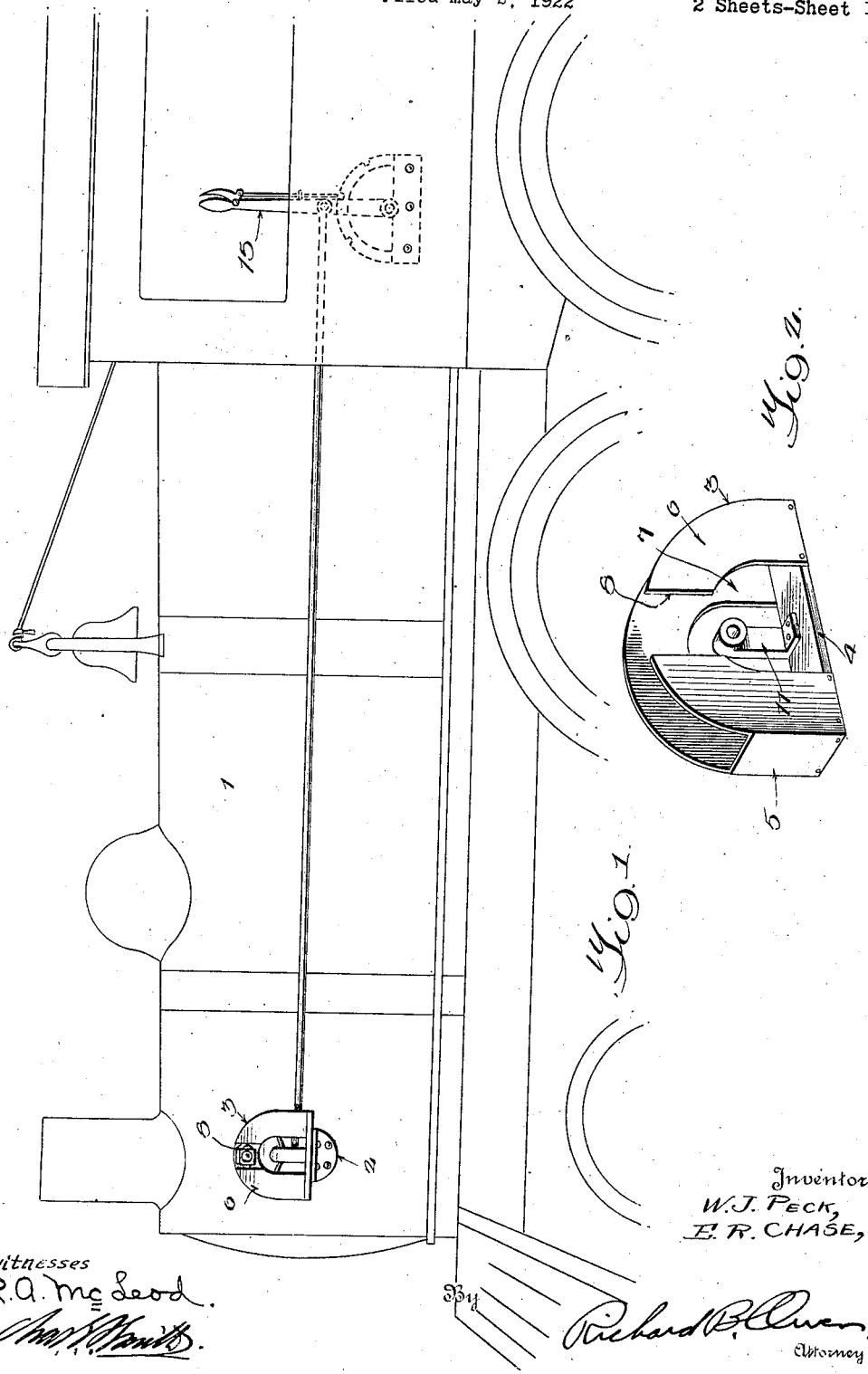

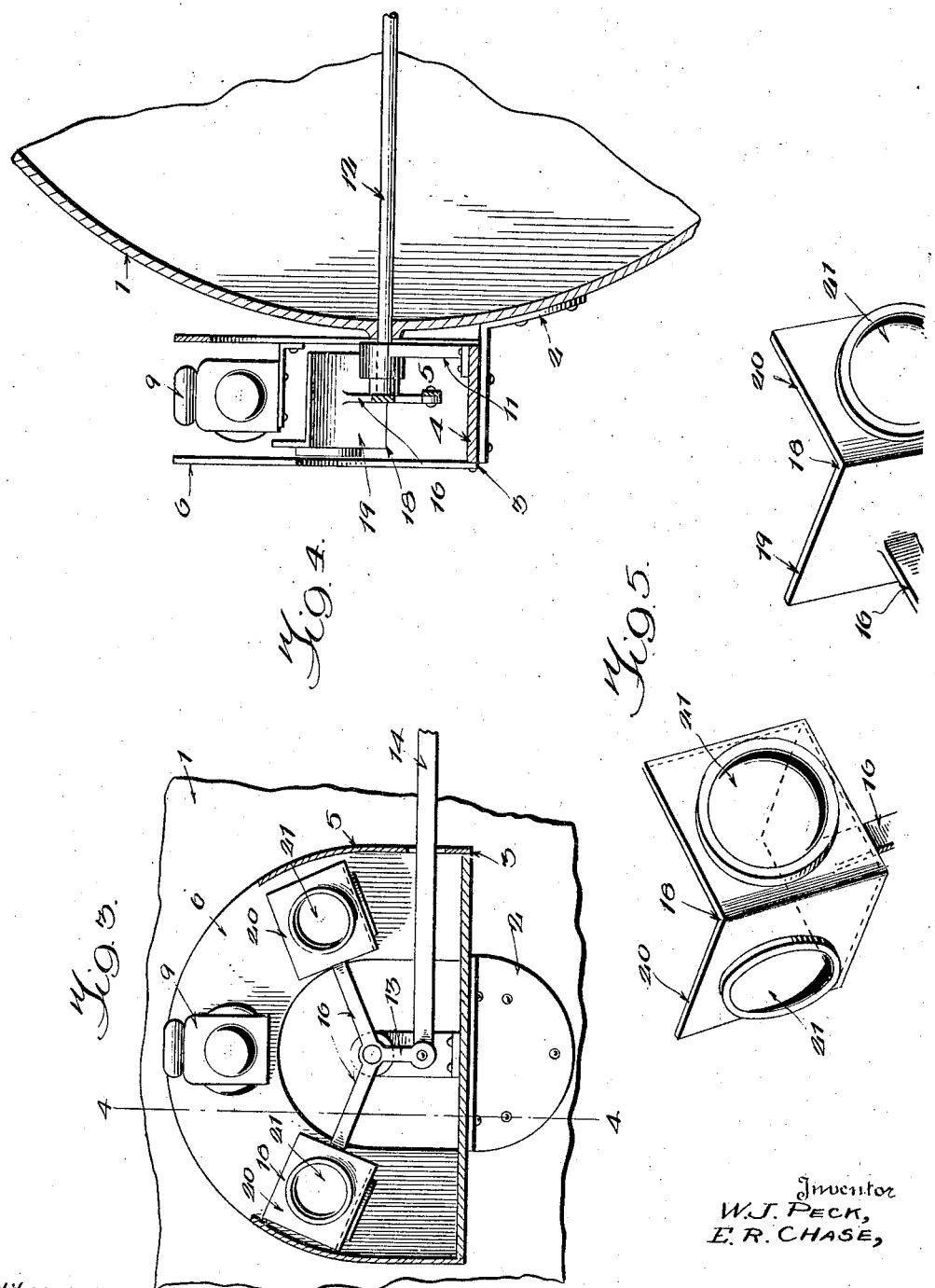

1,463,439

UNITED STATES PATENT OFFICE.

WILLIAM J. PECK, OF WHITE RIVER JUNCTION, VERMONT, AND ELLE R. CHASE, OF WEST LEBANON, NEW HAMPSHIRE.

SIGNAL.

Application filed May 2, 1922. Serial No. 557,965.

*To all whom it may concern:*

Be it known that we, WILLIAM J. PECK and ELLE R. CHASE, citizens of the United States, residing at White River Junction, in the county of Windsor and State of Vermont, and at West Lebanon, in the county of Grafton and State of New Hampshire, respectively, have invented certain new and useful Improvements in a Signal, of which the following is a specification.

The present invention relates to a signal especially useful with locomotives and the like and has for its principal object to provide means whereby the signal may be varied from the cabin of the locomotive.

Another object of the invention is to provide a simple and efficient signal which will be effective in use and reliable in operation.

With the above and other objects in view, the invention resides in certain novel features of construction, and the combination and arrangement of parts as will be hereinafter more fully described and claimed.

In the drawing:—

Figure 1 is a diagrammatic view of a locomotive showing our invention attached thereto, Figure 2 is a perspective of the signal casing, Figure 3 is a vertical section therethrough, Figure 4 is a section taken substantially on the line 4—4 of Figure 3, and Figure 5 is a perspective of the color varying means used with the signal.

Referring to the drawings in detail it will be seen that 1 designates a locomotive which may be of any preferred construction and has the bracket 2 mounted thereon adjacent its forward end, one on each side, for supporting the signal casings indicated generally at 3. Each of these casings 3 comprise a bottom 4 having end walls 5 and side walls 6. The side walls 6 are arcuate in shape being provided with the lower openings 7 and upper square openings 8. These side walls 6 extend above the end walls 5 so that a lamp 9 may be seen from the ends of the casings normally. The opening 8 is only provided in one of the side walls 6, that is the outer side wall when the casing is applied to the locomotive. A journal bracket 11 is mounted on the bottom 4 of each casing. In these journal brackets a shaft 12 is journaled which is actuated by a crank 13 through the rod 14 which is connected to the operating lever 15 suitably mounted in the cab of the engine. Each end of the shaft 12 is provided with a pair of diverging arms 16 which have mounted thereon the members 18 which are formed from the bottoms 19 and a pair of right angularly extending walls 20 having windows 21 provided therein which are adapted to register with the windows of the lamp 9. The windows 21 will be of two different colors, white and green so that the color of light may be changed for signaling purposes as will be understood by those familiar with the railroad signaling system.

Having thus described our invention what we claim as new is:—

1. A signal of the class described comprising a casing including a bottom, end walls, and side walls, said side walls being higher than said end walls, a source of illumination mounted on one of said side walls adjacent its upper ends so as to be seen from the ends of the casing, and means for changing the color of the light projected by said source of illumination.

2. A signal of the class described including a casing, a source of illumination in the casing, a shaft rotatable in the casing, a pair of diverging arms extending from the shaft, members on said arms, each member comprising a pair of panels to be used as flags in daytime disposed at right angles to each other, and windows in the panels adapted to be moved with the panels in association with the source of illumination in the manner and for the purpose specified.

In testimony whereof we affix our signatures in presence of two witnesses.

WILLIAM J. PECK.
ELLE R. CHASE.

Witnesses:
WILLIAM S. PINGREE,
SAMUEL E. PINGREE.